United States Patent
Wang et al.

(12) United States Patent (10) Patent No.: US 8,774,708 B2
(45) Date of Patent: Jul. 8, 2014

(54) ESTIMATION OF REPEATER LOOP DELAY FOR REPEATER GAIN CONTROL

(75) Inventors: Michael Mao Wang, San Diego, CA (US); Gwendolyn Denise Barriac, Encinitas, CA (US); Dhananjay Ashok Gore, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 247 days.

(21) Appl. No.: 13/372,385

(22) Filed: Feb. 13, 2012

(65) Prior Publication Data

US 2013/0122802 A1 May 16, 2013

Related U.S. Application Data

(60) Provisional application No. 61/558,294, filed on Nov. 10, 2011.

(51) Int. Cl.
*H04B 7/14* (2006.01)

(52) U.S. Cl.
USPC ............ 455/7; 455/9; 455/11.1; 455/15; 455/24; 455/571; 375/211

(58) Field of Classification Search
CPC .................. H04B 7/2606; H04W 84/07
USPC ............ 455/7, 9, 571, 24, 11.1, 15; 375/211
See application file for complete search history.

(56) References Cited

U.S. PATENT DOCUMENTS

| | | | |
|---|---|---|---|
| 5,095,528 A * | 3/1992 | Leslie et al. | 455/10 |
| 6,684,058 B1 * | 1/2004 | Karacaoglu et al. | 455/20 |
| 7,715,785 B2 | 5/2010 | Braithwaite | |
| 8,060,009 B2 * | 11/2011 | Gainey et al. | 455/15 |
| 2004/0106382 A1 | 6/2004 | Fisher et al. | |
| 2006/0040611 A1 | 2/2006 | Ding et al. | |
| 2006/0172781 A1 | 8/2006 | Mohebbi | |
| 2009/0291632 A1 | 11/2009 | Braithwaite et al. | |
| 2010/0284445 A1 | 11/2010 | Barriac et al. | |
| 2010/0285737 A1 | 11/2010 | Gore et al. | |

(Continued)

FOREIGN PATENT DOCUMENTS

WO 2011051746 A1 5/2011

OTHER PUBLICATIONS

International Search Report and Written Opinion—PCT/US2012/061621—ISA/EPO—Jan. 2, 2013.

*Primary Examiner* — Sanh Phu
(74) *Attorney, Agent, or Firm* — Muncy, Geissler, Olds & Lowe, P.C.

(57) ABSTRACT

Methods and apparatus for estimating a loop delay value ($N_{delay}$) in an interference cancellation repeater are presented. For example, a method may include setting a repeater gain to an initial gain value, setting a delay parameter to an initial time value, and measuring a loop gain associated with the delay parameter and the repeater gain by detecting a feedback signal with an echo canceller disabled. The method may further include determining whether the measured loop gain is larger than a previously measured loop gain, and if so, designating the delay parameter as the loop delay value ($N_{delay}$); and decrementing the delay parameter when the measured loop gain is not larger than the previously measured loop gain, and when the delay parameter is not at a final time value. The method may iterate until the delay parameter is less than or equal to the final time value.

22 Claims, 4 Drawing Sheets

(56) References Cited

U.S. PATENT DOCUMENTS

| | | |
|---|---|---|
| 2010/0285742 A1 | 11/2010 | Wang et al. |
| 2011/0143658 A1 | 6/2011 | Hanson et al. |
| 2011/0170473 A1 | 7/2011 | Proctor, Jr. et al. |
| 2011/0206088 A1* | 8/2011 | Binder et al. ............ 375/136 |

* cited by examiner

ESTIMATION OF REPEATER LOOP DELAY FOR REPEATER GAIN CONTROL

CLAIM OF PRIORITY UNDER 35 U.S.C. §119

The present Application for Patent claims priority to Provisional Application No. 61/558,294 entitled "ESTIMATION OF REPEATER LOOP DELAY FOR REPEATER GAIN CONTROL," filed Nov. 10, 2011, and assigned to the assignee hereof and hereby expressly incorporated by reference herein.

FIELD OF DISCLOSURE

This disclosure generally relates to repeaters in wireless communication systems, and in particular, to time delay estimation techniques in a wireless repeater capable of performing echo cancellation.

BACKGROUND

Figure 1:
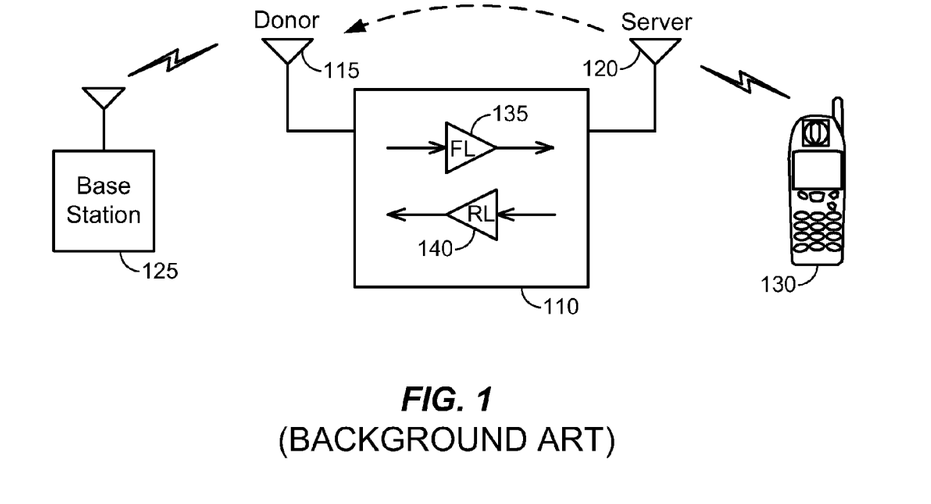
FIG. 1 is a simplified diagram of a conventional repeater.

In general, a repeater is a device that receives a signal, amplifies the signal, and transmits the amplified signal. FIG. 1 shows a basic diagram of a repeater 110 in the context of a wireless communications system. Repeater 110 may include a donor antenna 115 as an example network interface to network infrastructure such as a base station 125. Repeater 110 also includes a server antenna 120 (also referred to as a "coverage antenna") as a mobile interface to mobile device 130. In operation, the donor antenna 115 may be in communication with the base station 125, while the server antenna 120 may be in communication with the mobile devices 130. In the repeater 110, signals from the base station 125 may be amplified using a Forward Link (FL) path 135, while signals from the mobile device 130 may be amplified using a Reverse Link (RL) path 140. Many configurations may be used for the forward link circuitry 135 and the reverse link circuitry 140.

Repeaters may take on a wide variety of different forms depending upon their intended environment of operation, functional requirements, and/or performance requirements. For some repeaters, both the network and mobile interfaces are wireless. In other repeaters, a wired network interface may be used. Some repeaters receive signals with a first carrier frequency and transmit amplified signals with a second carrier frequency different from the first carrier frequency. Other types of repeaters may receive and transmit signals using the same carrier frequency. For "same frequency" repeaters, one particular challenge may be managing the feedback that occurs when some of the transmitted signal leaks back to the receive circuitry and is amplified and transmitted again.

Existing same frequency repeaters may manage feedback using a number of techniques. For example, the repeater may be configured to provide physical isolation between the two antennae, filters may be used, and/or other conventional techniques may be employed.

Conventional repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may require substantially more isolation between the repeater's antennas. Moreover, in some traditional repeater implementations, the target is to achieve as high a gain as reasonable while maintaining a stable feedback loop (where stability typically implies that the loop gain is less than unity, as will be discussed in more detail below). However, increasing the repeater gain may render isolation more difficult due to the increased signal leaking back into the donor antenna.

In general, loop stability requirements imply that the level of the signal leaking back into the donor antenna from the coverage antenna is much lower than the level of the remote signal (the signal to be repeated). The maximum achievable signal to interference/noise ratio (SINR) at the output of the repeater is then the same as the SINR at the input to the repeater. High gain and improved isolation impose two contradicting demands required for modern day repeaters, especially those used for indoor applications.

In order for a repeater to remain stable, the loop gain of the system should remain less than 1 (0 dB). Hence, to ensure stability, a repeater should be able to accurately measure the loop gain, and to react quickly by lowering overall gain should the loop gain start to increase. Accordingly, repeater gain control is a factor in maintaining stability.

One parameter involved in repeater gain control is the loop gain estimate, which involves determining an estimate of the repeater loop delay. The loop delay, which can include the internal delay of the repeater and feedback path delay, may be dependent on internal components and processes within the repeater, and also the environment in which the repeater operates. Because of this environmental dependence, which may vary when the repeater is moved and/or when the channel conditions change, the loop delay may be difficult to predict in practice.

SUMMARY

Exemplary embodiments of the invention are directed to apparatuses and methods related to time delay estimation techniques in repeaters that perform echo cancellation in wireless communication systems.

In one embodiment, a method for estimating a loop delay value ($N_{delay}$) in an interference cancellation repeater is presented. The method may include setting a repeater gain to an initial gain value, setting a delay parameter to an initial time value, and measuring a loop gain associated with the delay parameter and the repeater gain by detecting a feedback signal with an echo canceller disabled. The method may further include determining whether the measured loop gain is larger than a previously measured loop gain, and if so, designating the delay parameter as the loop delay value ($N_{delay}$); and decrementing the delay parameter when the measured loop gain is not larger than the previously measured loop gain, and when the delay parameter is not at a final time value. The method may further include repeating the measuring, the determining, and the decrementing until the delay parameter is less than or equal to the final time value.

In another embodiment, a wireless repeater includes a first antenna to receive an input signal and a second antenna to transmit an amplified signal. The input signal being a sum of a remote signal to be repeated and a feedback signal resulting from a feedback channel between the first antenna and the second antenna. The wireless repeater further includes a first transceiver coupled to the first antenna which receives the input signal, the first transceiver further comprising receive and transmit front-end processing circuitry, and a second transceiver coupled to the second antenna which generates the amplified signal, the second transceiver further comprising receive and transmit front-end processing circuitry. The wireless repeater may further include a repeater baseband block coupled between the first transceiver and the second transceiver, the repeater baseband block being configured to determine a loop delay value ($N_{delay}$) based on the remote signal provided by the first transceiver and the feedback signal provided by the second transceiver.

In yet another embodiment, an echo cancellation repeater which estimates a loop delay value ($N_{delay}$) value is described. The echo cancellation repeater may include a first antenna to receive an input signal; and a second antenna to transmit an amplified signal, wherein the input signal is a sum of a remote signal to be repeated and a feedback signal resulting from a feedback channel between the first antenna and the second antenna. The echo cancellation repeater may further include a first transceiver coupled to the first antenna which receives the input signal, the first transceiver further comprising receive and transmit front-end processing circuitry. The echo cancellation repeater may further include a second transceiver coupled to the second antenna which generates the amplified signal, the second transceiver further comprising receive and transmit front-end processing circuitry. The echo cancellation repeater may further include a repeater baseband block coupled between the first transceiver and the second transceiver, the repeater baseband block comprising a processor and a memory, wherein the memory stores instructions causing the processor to set a repeater gain to an initial gain value, set a delay parameter to an initial time value, measure a loop gain associated with the delay parameter and the repeater gain by detecting a feedback signal with an echo canceller disabled, determine whether the measured loop gain is larger than a previously measured loop gain, and if so, designating the delay parameter as the loop delay value ($N_{delay}$), decrement the delay parameter when the measured loop gain is not larger than the previously measured loop gain, and when the delay parameter is not at a final time value, and repeat the measuring, the determining, and the decrementing until the delay parameter is less than or equal to the final time value.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Systems and methods herein provide for wireless repeaters with improved isolation between the repeaters' donor antenna ("the receiving antenna" in the example of a forward link transmission) and the coverage antenna ("the transmitting antenna" for forward link transmissions). Furthermore, in some embodiments, systems and techniques herein provide for a unique repeater design employing interference cancellation (also termed herein as echo cancellation) to significantly improve the isolation. In some embodiments, the interference cancellation may be realized using improved channel estimation techniques provided herein for accurate estimation of the channel. Effective cancellation utilizes accurate channel estimation of the feedback channel (also known as a "leakage channel"). In general, the more accurate the feedback channel estimate, the higher the cancellation and hence the higher the effective isolation. Herein, "interference cancellation" and "echo cancellation" refer to techniques that reduce or eliminate the amount of feedback signal between repeater antennas. In various embodiments, "interference cancellation" and "echo cancellation" may refer to the cancellation of an estimated feedback signal, which can provide for partial or complete cancellation of the actual feedback signal.

According to another aspect, systems and methods herein provide for a wireless repeater design employing gain control techniques for enhancing the stability of the repeater system. One or more metrics for measuring the stability of the repeater system may be utilized, and the gain of the repeater may be controlled based on the value of these metrics as an indicator of stability. For example, one metric which may be utilized for maintaining stability is the loop gain. The loop gain may include the gain of the repeater itself and the gain of the feedback channel. Exemplary metrics which may be used in gain control are presented in U.S. Patent Application: "MULTI-METRIC GAIN CONTROL FOR WIRELESS REPEATER," having U.S. application Ser. No. 12/722,722, filed on Mar. 12, 2010, publishing as US Pat. Pub. No. US 2010/0285739, assigned to the assignee hereof, and expressly incorporated by reference herein.

To properly determine the loop gain, the loop delay should be ascertained. Embodiments provided herein and described below are directed to an echo cancellation repeater which may automatically and accurately determine the loop delay at repeater initialization (e.g., boot-up), or whenever necessary.

Figure 2:
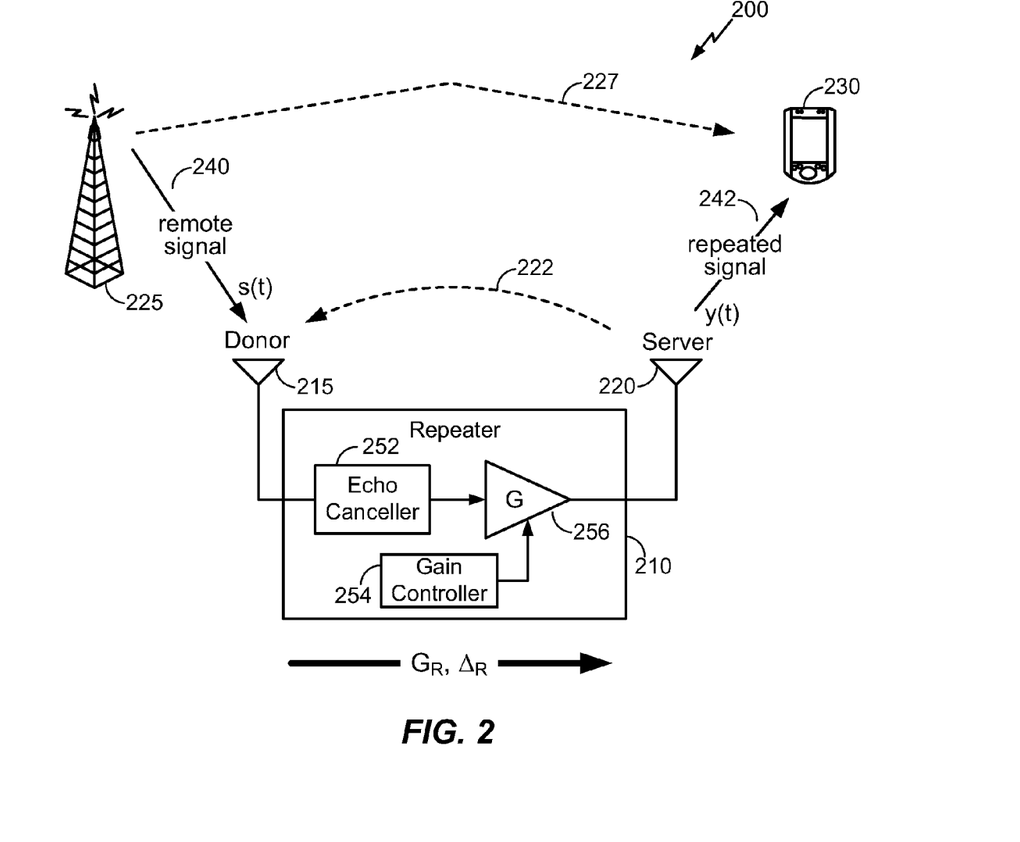
FIG. 2 shows a top level block diagram of one embodiment of an echo cancellation repeater within an exemplary environment.

FIG. 2 shows a top level block diagram of one embodiment of an echo cancellation repeater 210 within an exemplary environment 200. The example of FIG. 2 illustrates forward link transmissions, such as a remote signal (s(t)) 240 from a base station 225, which is intended for a mobile device 230. The repeater 210, may be used in the exemplary environment 200 if an un-repeated signal along the path 227, between the base station 225 and the mobile device 230, would not possess sufficient signal strength for effective voice and/or data communications when received at the mobile device 230. The repeater 210 is configured to provide a repeated signal (y(t)) 242 to mobile device 230, by amplifying the remote signal 240 received from the base station 225 on a donor antenna 215. The repeated signal 242, which is transmitted to the mobile device 230 using a server antenna 220, may experience an overall gain $G_R$ and a delay $\Delta_R$ as supplied by the repeater 210. The repeater 210 includes forward link circuitry for amplifying and transmitting signals received from the base station 225 to the mobile device 230 through the donor antenna 215 and the server antenna 220. While not shown in FIG. 2, the repeater 210 may also include reverse link circuitry for amplifying and transmitting signals from the mobile device 230 back to the base station 225.

On the forward link, the remote signal s(t) is received at the donor antenna 215 as an input signal, and the remote signal s(t) is ideally repeated as a delayed and amplified signal y(t), where $y(t)=G_R s(t-\Delta_R)$. Ideally, the overall gain $G_R$ would be large, the inherent delay $\Delta_R$ of the repeater would be small, the input SINR would be maintained at the output of repeater 210 (this can be of particular importance for data traffic support), and only desired carriers would be amplified.

In practice, the overall gain of the repeater 210 may be limited by the isolation between the donor antenna 215 and the server antenna 220. If the overall gain is too large, the repeater can become unstable due to signal feedback. Signal feedback refers to the phenomenon where a portion of the signal that is transmitted from one antenna (in FIG. 2, the server antenna 220) is received by the other antenna (in FIG. 2, the donor antenna 215), as shown by the feedback path 222 in FIG. 2. Without interference cancellation or other techniques, the repeater would amplify this feedback signal as part of its normal operation, and the amplified feedback signal would again be transmitted by server antenna 220. The repeated transmission of the amplified feedback signal due to signal feedback and high repeater gain can lead to repeater instability. The output SINR of the repeater is dependent on RF non-linearities and other signal processing. Thus, the aforementioned ideal repeater operational characteristics are often not attained.

In embodiments of the current disclosure, a repeater which may be suitable for indoor coverage (e.g., business, residential, and/or similar use) is provided. The repeater may have an active overall gain of about 70 dB or greater which is an example of a sufficient gain for coverage in a moderately sized residence. Furthermore, the repeater has a loop gain of less than one for stability and a sufficient amount of margin for stability and low output noise floor. The stability of the loop gain can be maintained by controlling one or more gains elements within the repeater, as will be discussed in more detail below.

Further referring to FIG. 2, in an embodiment, the echo cancellation repeater 210 may further include an echo canceller 252, a gain controller 254, and a variable gain amplifier 256. On the forward link as shown in FIG. 2, a combined signal, which includes the remote signal s(t) 240 and the feedback signal over feedback path 222, may be provided to the echo canceller 252 by the donor antenna 215. The echo canceller 252 ideally removes the feedback signal from the combined signal to produce the desired remote signal s(t). Once the feedback signal is removed, the remote signal s(t) 240 may be amplified by the variable gain amplifier 256, which produces a variable gain G. The variable gain G may be set by a gain controller 254, which may be based upon a number of variables while maintaining stability of the repeater 210. For example, the gain controller 254 may determine the input Signal to Interference Noise Ratio (SINR) and the output SINR of the repeater. The input SINR may be used as an indicator of the output SINR and the noise floors added by the repeater. The variable gain G may be adjusted up or down to obtain the desired coverage area and the achievable data rate. Proper determination of the variable gain G by the gain controller 254 may involve determining the overall loop gain and the overall loop delay, which will be described in more detail below.

The communication system in which the repeater can be deployed includes various wireless communication networks based on infrared, radio, and/or microwave technology. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, etc. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Figure 3A:
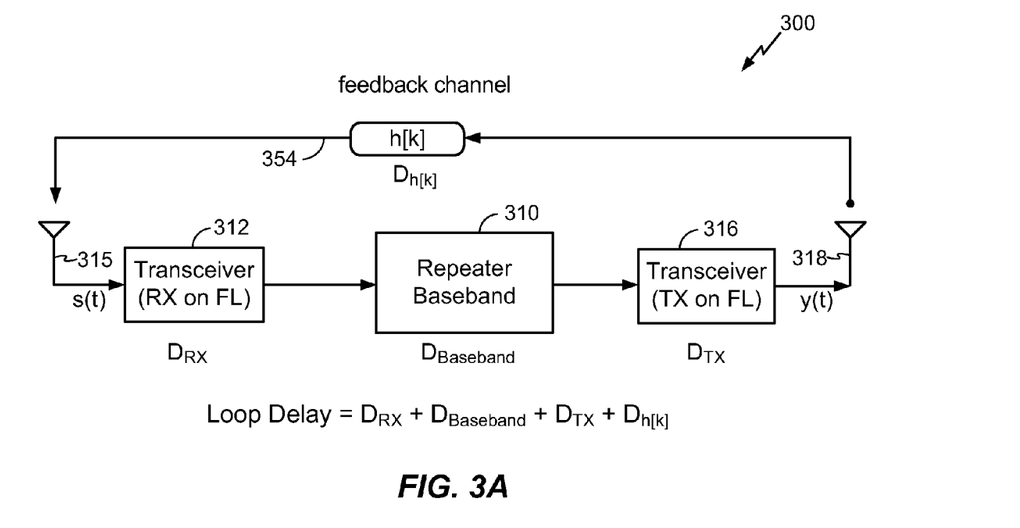
FIG. 3A is a block diagram of an exemplary echo cancellation repeater illustrating some components which contribute to the overall loop delay.

FIG. 3A is a block diagram of an exemplary echo cancellation repeater 300 illustrating some components which may contribute to the overall loop delay. During forward link operation, the echo cancellation repeater 300 receives a remote signal s(t) on a first antenna 315, and generates an output signal y(t) to be transmitted on a second antenna 318. The echo cancellation repeater 300 may include a first transceiver 312 coupled to the first antenna 315, a second transceiver 316 coupled to the second antenna 318, and a repeater baseband block 310 coupled to the first and second transceivers. Note that the echo cancellation repeater 300 is configured so the transceivers 312, 316 and the repeater baseband block 310 can communicate in full duplex mode on both the forward and reverse links. The first and second transceivers 312, 316 incorporate digital and/or analog front-end processing hardware for implementing the "front end and back end" receiving and transmitting functionality of the wireless repeater 300. The transceivers' 312, 316 processing circuitry can include variable gain amplifiers, filters, mixers, drivers and/or digital signal processors. The specific implementation of the repeater transceivers 312, 316 is not critical to the practice of the present invention. Any receiver/transmitter front-end processing circuitry, presently known or to be developed, can be applied in the wireless repeater of the present invention. The repeater baseband block 310 may implement channel estimation, baseband echo cancellation, and/or gain control operations. Details of the repeater baseband block 310 are described below and illustrated in the FIG. 3B.

Further referring to FIG. 3A, various components which contribute to the loop delay are illustrated. The overall loop delay may be represented by the following equation:

$$\text{Loop Delay} = D_{RX} + D_{Baseband} + D_{TX} + D_{h[k]}.$$

With respect to the forward loop, the delay contribution from the receiver in the first transceiver 312 is $D_{RX}$, which may include an aggregate delay of the forward link path that can include delays introduced by, for example, the antenna 315 and other components in the RF signal path. Such components may include RF filters, switches, circulators, low noise amplifiers, signal multipliers used in frequency down-conversion, etc. Other components adding delays may include analog-to-digital converters, various filters, etc.

The delay contribution from the baseband block 310 is $D_{Baseband}$, may include an aggregate delay of the forward link path that may include delays introduced by, for example, various demodulators, modulators, controllers and/or signal processors when performing echo cancellation, gain control, and other computational processes such digital filtering, demodulation, modulation, etc. Delay contributions for the baseband block 310 may further include controlled delays introduced by one or more variable delay elements (e.g., 346) which may be used, for example, in decorrelating the input signals and the feedback signals to improve echo cancellation performance.

The delay contribution from the transmitter in the second transceiver 316 is $D_{TX}$, which may include an aggregate delay of the forward link path that can include delays introduced by, for example, digital-to-analog conversion, various filters, signal multipliers used in frequency up-conversion, power noise amplifiers, the antenna 318 and other RF signal paths such as RF filters, switches, circulators, etc.

The delay contribution from the feedback channel 354 (h[k]) is $D_{h[k]}$, which may include delays associated with the channel conditions between the first antenna 315 and the second antenna 318. These delays may be based on environmental conditions which may vary with physical surroundings of the repeater and/or RF characteristics of the feedback channel. It is the delay contribution of the feedback channel $D_{h[k]}$ which may typically present a challenge to actually measure. Accordingly, methods are presented herein which estimate the total loop delay so that the individual contributors to the loop delay do not have to be individually measured.

Figure 3B:
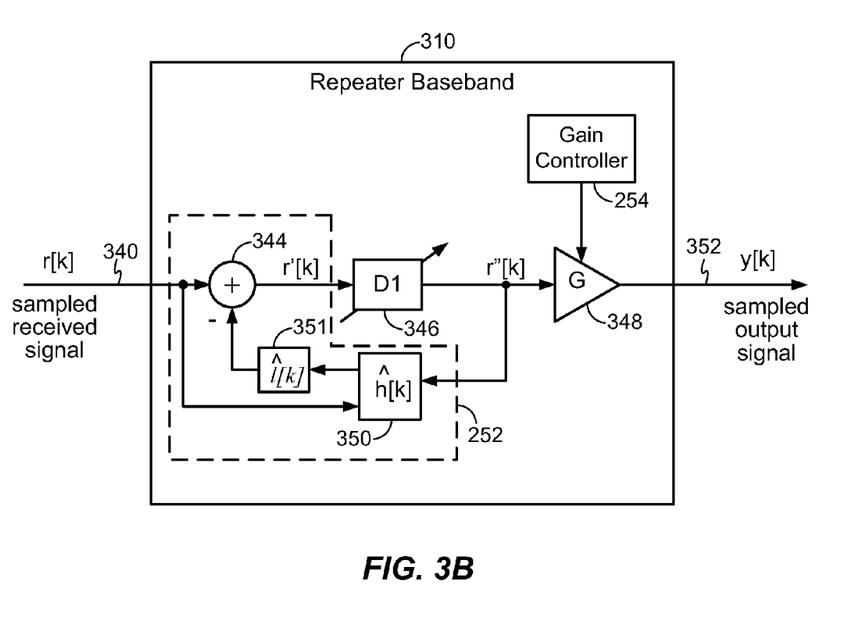
FIG. 3B is a block diagram illustrating details of a repeater baseband block according to one embodiment of the disclosure.

FIG. 3B is a block diagram illustrating exemplary components of a repeater baseband block 310, where echo cancellation may be performed according to one embodiment of the disclosure. In some embodiments, the repeater 300 employs an echo canceller 252 that may use the transmit signal as the pilot or reference signal for estimating the feedback channel. In one embodiment, for the purpose of estimating the feedback channel, the transmit signal may be the pilot and the remote signal may be treated as noise. The received signal of the repeater is the remote signal plus the feedback signal. The transmit signal may be fed into the channel estimation algorithm and the resulting feedback channel estimate can be used to generate a replica of the feedback signal—that is, the portion of the transmit signal that was echoed back to the donor antenna. The estimated feedback signal may then be subtracted from the received signal to cancel out the undesired feedback signal at the input to the repeater.

In one embodiment, a feedback delay control method is implemented in an echo cancellation repeater to improve the channel estimation and echo cancellation performance. When estimating the feedback channel, a variable delay element 346 may be introduced in the repeater to decrease the correlation between the pilot and the remote signal. Correlation between the pilot, which is the transmit signal, and the remote signal can degrade the channel estimation. The values of variable delay element 346 may be selected to introduce enough delay to reduce the correlation without degrading the performance of the repeater.

Further referring to FIG. 3B, over an input node 340, the repeater baseband block 310 receives a sampled version of a received signal r[k] which is the sampled sum of the remote signal s(t) on a donor antenna and the feedback signal provided over the feedback channel 354. The signal feedback may be represented as the transmitted samples convolved with the feedback channel (h[k]) 354. Echo cancellation repeater 300 operates to estimate the feedback signal in order to cancel out the undesired feedback signal component in the received signal. To that end, repeater baseband block 310 includes an echo canceller which may further include a summer 344 and a feedback signal estimation block 351, working in conjunction with a channel estimation block 350. The received signal r[k] may be coupled to the summer 344 which operates to remove a feedback signal estimate $\hat{i}[k]$ from the receive signal r[k]. As long as the feedback signal estimate $\hat{i}[k]$ is accurate, the undesired feedback signal may be removed from the receive signal and echo cancellation can be realized. In the present embodiment, the post cancellation signal r'[k] may be coupled through a delay element 346 having a variable delay D1, to produce a delayed post cancellation signal r"[k], and then passed to a variable gain amplifier 348 that generates the output signal y[k] on the output node 352 for transmission subsequent processing by the second transceiver 316. The channel estimation block 350 operates to estimate the feedback channel h[k], and thus computes an estimate of the feedback channel $\hat{h}[k]$. Feedback signal estimation block 351 takes the feedback channel estimate $\hat{h}[k]$ and computes an estimate of the feedback signal $\hat{i}[k]$ for the purpose of echo cancellation.

According to one feedback delay control method, a variable delay D1 may be provided in the receive circuitry of echo cancellation repeater 300 to introduce a delay in the post cancellation signal of the echo cancellation repeater. The variable delay D1 may selected so that it is just large enough for the output signal y[k] and the remote signal s(t) to be decorrelated, but small enough to meet repeater performance requirements. During echo cancellation operation, the variable delay D1 may be tunable and can be adjusted when the repeater is started up and can be tuned periodically when the repeater is in operation to account for changes in the correlation structure of the remote signal. When various embodiments are used to determine the loop delay of the repeater 300, the echo canceller 252 may be inactivated, and the variable delay element 346 can be used as provided below in the description of FIG. 4.

Figure 4:
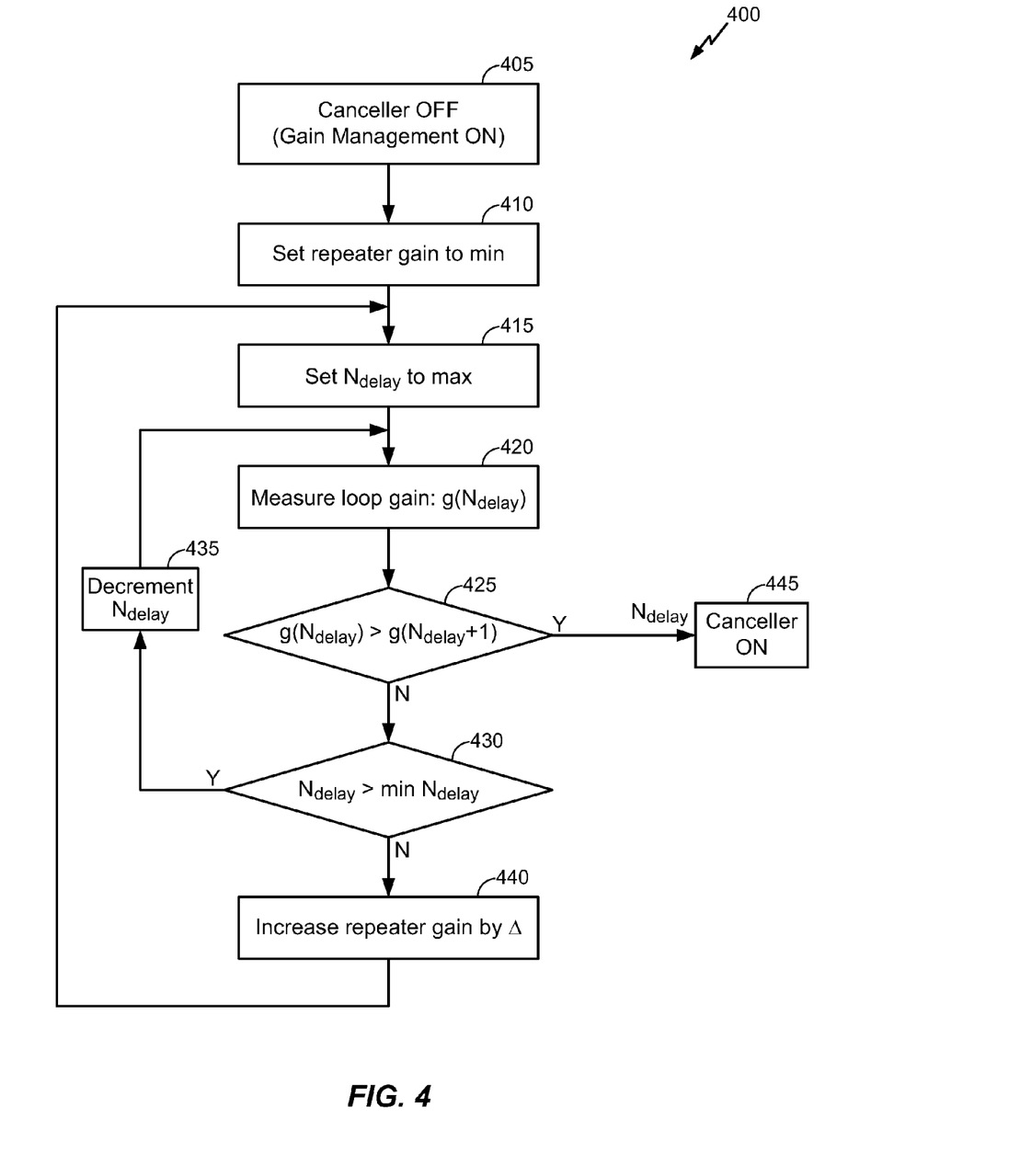
FIG. 4 is an exemplary process for determining the loop delay of the echo cancellation repeater.

FIG. 4 depicts a flow chart of an exemplary process 400 for determining the loop delay of the echo cancellation repeater 300. In one embodiment, the process 400 may measure and compare the loop gains derived from the feedback signal, over a predetermined range of time delays, for a set repeater gain. When a peak in the loop gain is detected, the time delay value at which the peak occurs is saved as the loop delay value. If a peak is not detected, the repeater gain may be increased, and the search for a peak is restarted over the predetermined range of time delays. Details of the loop delay determination the process 400 are described below.

Process 400 may be performed whenever the echo cancellation repeater 300 is initialized subsequent to be powered on (e.g., during a "reboot") or automatically based upon how accurate the loop gain metric is being determined. In other embodiments, the echo cancellation repeater 300 may perform process 400 upon receiving a command directly from a user, or remotely from the base station 125. Initially, the echo cancellation repeater 300 may deactivate the echo canceller 252 while maintaining operation of the gain controller 254 (Block 405). Because the echo canceller 252 suppresses the feedback signal by design, its deactivation may ease of the detection of amplitude comparisons within the feedback signal, and thus may improve the accuracy and performance of the loop delay determination process 400. During the process 400, the repeater may use input signals it typically receives during its normal operation to determine the loop delay. In alterative embodiments, the repeater 300 may inject a known signal designed to increase the probability of detecting the feedback signal, such as, for example, a pilot signal.

Further referring to FIG. 4, the repeater 300 may initialize the repeater gain by setting the gain to a minimum value (Block 410). This may be accomplished by changing the gain on the variable gain amplifier 348 in the baseband block 310 via gain controller 254. The repeater 300 may then initialize a delay parameter by setting the time delay D1 on time delay element 346 to an initial time value. During subsequent stages of process 400, the delay parameter may be iterated over a number of values falling within a predetermined time window. The initial value of the delay parameter may be set as the maximum value in the window (Block 415). Process 400 may then measure the loop gain at the gain associated with the delay parameter and the repeater gain by detecting the feedback signal (Block 420). As noted above, the loop gain measurement occurs when the echo canceller 252 is disabled.

The repeater 300 may then make a comparison to determine if the loop gain measurement, as determined in Block 420, is larger than a previously determined gain measurement (Block 425). If so, the delay parameter is designated as the loop delay value ($N_{delay}$), and the echo canceller 252 may be activated (Block 445). At this point, process 400 may terminate, and the repeater may use the loop delay value in subsequent gain control and/or echo cancellation operations.

If in Block 425 it is determined that the loop gain measurement determined in Block 420 is not larger that the previously determined gain measurement, then the repeater may test whether the delay parameter is not at a final value (e.g., the minimum value in the time window) (Block 430). If the delay parameter still lies within the time window (i.e., it is not at the final value), then the delay parameter may be decremented (Block 435), and the process 400 repeats Block 420 and Block 425, and possibly Block 430 depending upon the result in Block 425.

If in Block 430 the delay parameter is outside the final value of the predetermined time window (e.g., the delay parameter is less than or equal to the minimum delay value permitted), then the process 400 may increase the repeater gain value (Block 440), and transfer control back to Block 415 to reset the delay parameter to the initial value of the time window. Process 400 will increase the gain to within the limits of variable gain amplifier 348 and, for each gain value, iterate delay parameter over the predetermined time window, until a loop delay value ($N_{delay}$) is determined in Block 425.

Figure 5:
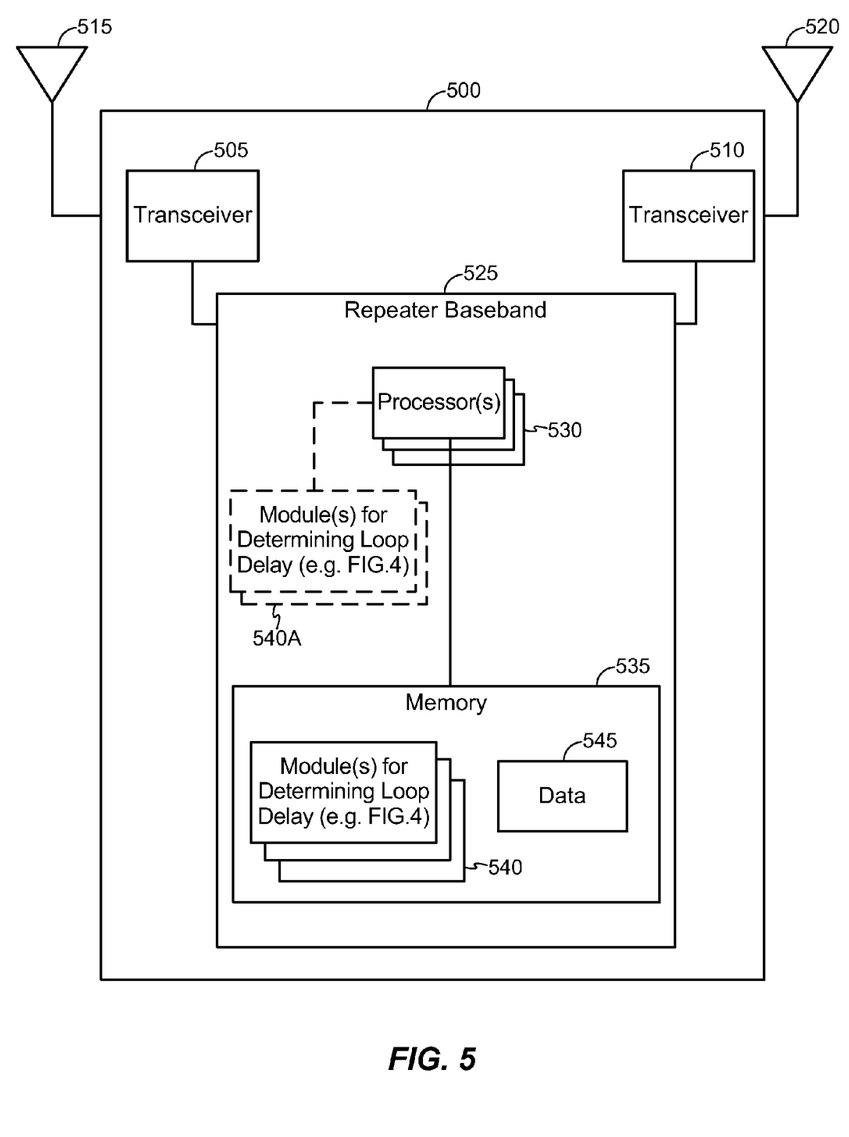
FIG. 5 is a structural block diagram of an exemplary echo cancellation repeater which can be configured to perform the loop delay determination process.

FIG. 5 is a structural block diagram of an exemplary echo cancellation repeater 500 which can be configured to perform the loop delay determination process 400. Echo cancellation repeater 500 may include first and second transceivers 505, 510, a donor antenna 515, a server antenna 520, and a baseband processor 525. The first and second transceivers 505, 510 may incorporate digital and/or analog processing circuitry for implementing both receive and transmit functionality of the echo cancellation repeater 500. In one embodiment, the first and second transceivers 505, 510 each may incorporate components used in conventional wireless receivers and transmitters. Such components may include variable gain amplifiers, filters, mixers, drivers, modulators, de-modulators, digital-to-analog converters, analog-to-digital converters, etc. Each transceiver 505, 510 may support transceiver operations using their respective antennas. For example, first transceiver 505 may support the transmission and reception of signals with a base station using donor antenna 515. Transceiver 510 may support the transmission and reception of signals with a mobile device using server antenna 520. The first and second transceivers 505, 510 may provide analog and/or digital signals which have been down-converted to baseband to the baseband processor 525. The baseband processor 525 may perform a signal processing and control functions for repeater communications with the mobile device and base station, including echo cancellation, gain control, and loop delay determination, as set forth in the aforementioned embodiments, including the process 400 depicted in the flow chart shown in FIG. 4.

In one embodiment, the baseband processor 525 may include one or more processors 530 which can be configured to perform the techniques described herein, and may include general purpose processors, digital signal processors, controllers, etc. The processors may further be functionally coupled to memory 535, which may contain instructions within on or more modules 540, and/or data 545 for utilization by the one or more processors 530. Memory 535 may be contained within the baseband processor 525 (as shown in FIG. 5), or reside external to the baseband processor 525, or both.

In an alternative embodiment, the modules for executing the process 400 may be embodied as hardware modules 540A, as exemplified using dashed lines shown in FIG. 5. The hardware modules may be operably coupled to processor(s) 530. In yet another embodiment (not shown), the functional operations for performing process 400 may be implemented using a combination of both hardware and software modules.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, or within a processor in conjunction with computer software, or various combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for estimating a loop delay value in an echo cancellation repeater. The invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for estimating a loop delay value ($N_{delay}$) in an interference cancellation repeater, the method comprising:
    setting a repeater gain to an initial gain value;
    setting a delay parameter to an initial time value;
    measuring a loop gain associated with the delay parameter and the repeater gain by detecting a feedback signal with an echo canceller disabled;
    determining whether the measured loop gain is larger than a previously measured loop gain, and if so, designating the delay parameter as the loop delay value ($N_{delay}$);
    decrementing the delay parameter when the measured loop gain is not larger than the previously measured loop gain, and when the delay parameter is not at a final time value; and
    repeating the measuring, the determining, and the decrementing until the delay parameter is less than or equal to the final time value.

2. The method of claim 1, further comprising:
    activating the echo canceller when it is determined that the measured loop gain is larger than then the previously measured loop gain; and
    utilizing the loop delay value ($N_{delay}$) in the echo canceller.

3. The method of claim 1, further comprising:
    increasing the repeater gain when the delay parameter is less than or equal to the final time value; and
    repeating the setting, the measuring, the determining, and the decrementing until the loop delay value ($N_{delay}$) is i determined.

4. The method of claim 1, wherein the initial gain value is a minimum gain setting.

5. The method of claim 1, wherein the initial time value is a maximum delay value.

6. The method of claim 1, further comprising:
    injecting a known signal into the interference cancellation repeater to increase a probability of detection of the feedback signal.

7. The method of claim 6, wherein the known signal is a pilot signal.

8. The method of claim 1, wherein the method is performed upon initialization or boot-up of the interference cancellation repeater.

9. The method of claim 8, wherein initialization or boot-up of the interference cancellation repeater may be performed when the interference cancellation repeater is moved or when channel conditions change.

10. A wireless repeater having a first antenna to receive an input signal and a second antenna to transmit an amplified signal, the input signal being a sum of a remote signal to be repeated and a feedback signal resulting from a feedback channel between the first antenna and the second antenna, the wireless repeater comprising:
    a first transceiver coupled to the first antenna which receives the input signal, the first transceiver further comprising receive and transmit front-end processing circuitry;
    a second transceiver coupled to the second antenna which generates the amplified signal, the second transceiver further comprising receive and transmit front-end processing circuitry; and
    a repeater baseband block coupled between the first transceiver and the second transceiver, the repeater baseband block being configured to determine a loop delay value ($N_{delay}$) based on the remote signal provided by the first transceiver and the feedback signal provided by the second transceiver.

11. The wireless repeater of claim 10, wherein the repeater baseband block is further configured to
    set a repeater gain to an initial gain value,
    set a delay parameter to an initial time value,
    measure a loop gain associated with the delay parameter and the repeater gain by detecting a feedback signal with an echo canceller disabled,
    determine whether the measured loop gain is larger than a previously measured loop gain, and if so, designating the delay parameter as the loop delay value ($N_{delay}$),
    decrement the delay parameter when the measured loop gain is not larger than the previously measured loop gain, and when the delay parameter is not at a final time value, and
    repeat the measuring, the determining, and the decrementing until the delay parameter is less than or equal to the final time value.

12. The wireless repeater of claim 11, wherein the repeater baseband block is further configured to
   activate the echo canceller when it is determined that the measured loop gain is larger than then previously measured loop gain, and
   utilize the loop delay value ($N_{delay}$) in the echo canceller.

13. The wireless repeater of claim 11, wherein the repeater baseband block further is configured to
   increase the repeater gain when the delay parameter is less than or equal to a final time value, and
   repeat the setting, the measuring, the determining, and the decrementing until the loop delay value ($N_{delay}$) is determined.

14. The wireless repeater of claim 11, wherein the initial gain value is a minimum gain setting.

15. The wireless repeater of claim 11, wherein the initial time value is a maximum delay value.

16. The wireless repeater of claim 10, wherein the repeater baseband block further is configured to
   inject a known signal into the wireless repeater to increase a probability of detection of the feedback signal.

17. The wireless repeater of claim 16, wherein the known signal is a pilot signal.

18. The wireless repeater of claim 10, wherein the loop delay value ($N_{delay}$) is determined upon initialization or boot-up of the wireless repeater.

19. The wireless repeater of claim 18, wherein initialization or boot-up of the wireless repeater may be performed when the wireless repeater is moved or when channel conditions change.

20. An interference cancellation repeater which estimates a loop delay value ($N_{delay}$), the interference cancellation repeater comprising:
   a first antenna to receive an input signal;
   a second antenna to transmit an amplified signal, wherein the input signal is a sum of a remote signal to be repeated and a feedback signal resulting from a feedback channel between the first antenna and the second antenna;
   a first transceiver coupled to the first antenna which receives the input signal, the first transceiver further comprising receive and transmit front-end processing circuitry;
   a second transceiver coupled to the second antenna which generates the amplified signal, the second transceiver further comprising receive and transmit front-end processing circuitry; and
   a repeater baseband block coupled between the first transceiver and the second transceiver, the repeater baseband block comprising a processor and a memory, wherein the memory stores instructions causing the processor to
      set a repeater gain to an initial gain value,
      set a delay parameter to an initial time value,
      measure a loop gain associated with the delay parameter and the repeater gain by detecting a feedback signal with an echo canceller disabled,
      determine whether the measured loop gain is larger than a previously measured loop gain, and if so, designating the delay parameter as the loop delay value ($N_{delay}$),
      decrement the delay parameter when the measured loop gain is not larger than the previously measured loop gain, and when the delay parameter is not at a final time value, and
      repeat the measuring, the determining, and the decrementing until the delay parameter is less than or equal to the final time value.

21. An apparatus for estimating a loop delay value ($N_{delay}$) in an interference cancellation repeater, the apparatus comprising:
   means for setting a repeater gain to an initial gain value;
   means for setting a delay parameter to an initial time value;
   means for measuring a loop gain associated with the delay parameter and the repeater gain by detecting a feedback signal with an echo canceller disabled;
   means for determining whether the measured loop gain is larger than a previously measured loop gain, and if so, designating the delay parameter as the loop delay value ($N_{delay}$);
   means for decrementing the delay parameter when the measured loop gain is not larger than the previously measured loop gain, and when the delay parameter is not at a final time value; and
   means for repeating the measuring, the determining, and the decrementing until the delay parameter is less than or equal to the final time value.

22. A non-transitory computer-readable medium comprising program code, which when executed by one or more processors causes the processor to perform functions for estimating a loop delay value ($N_{delay}$) in an interference cancellation repeater, the program code comprising:
   program code to set a repeater gain to an initial gain value;
   program code to set a delay parameter to an initial time value;
   program code to measure a loop gain associated with the delay parameter and the repeater gain by detecting a feedback signal with an echo canceller disabled;
   program code to determine whether the measured loop gain is larger than a previously measured loop gain, and if so, designating the delay parameter as the loop delay value ($N_{delay}$);
   program code to decrement the delay parameter when the measured loop gain is not larger than the previously measured loop gain, and when the delay parameter is not at a final time value; and
   program code to repeat the measuring, the determining, and the decrementing until the delay parameter is less than or equal to the final time value.

* * * * *